US008297315B2

(12) United States Patent
Esveldt

(10) Patent No.: US 8,297,315 B2
(45) Date of Patent: Oct. 30, 2012

(54) THROTTLE VALVE

(75) Inventor: Vincent Esveldt, Werkendam (NL)

(73) Assignee: Mokveld Valves B.V., Gouda (NL)

( * ) Notice: Subject to any disclaimer, the term of this patent is extended or adjusted under 35 U.S.C. 154(b) by 552 days.

(21) Appl. No.: 12/449,038

(22) PCT Filed: Feb. 7, 2008

(86) PCT No.: PCT/EP2008/000939
§ 371 (c)(1),
(2), (4) Date: Jul. 21, 2009

(87) PCT Pub. No.: WO2008/098702
PCT Pub. Date: Aug. 21, 2008

(65) Prior Publication Data
US 2010/0025608 A1 Feb. 4, 2010

(30) Foreign Application Priority Data

Feb. 13, 2007 (DE) .......................... 10 2007 007 664

(51) Int. Cl.
*F16K 47/08* (2006.01)
(52) U.S. Cl. .................. 137/625.3; 251/65; 251/129.11
(58) Field of Classification Search .............. 251/65, 251/250, 129.11–129.13; 137/625.3
See application file for complete search history.

(56) References Cited

U.S. PATENT DOCUMENTS 2,052,987 A * 9/1936 Persons .......................... 251/250
3,355,140 A * 11/1967 Andersen ........................ 251/65
4,267,148 A * 5/1981 Dickson et al. ................. 422/53
(Continued)

FOREIGN PATENT DOCUMENTS
DE 1 263 430 3/1968
(Continued)

OTHER PUBLICATIONS
International Search Report.
(Continued)

*Primary Examiner* — Eric Keasel
(74) *Attorney, Agent, or Firm* — Collard & Roe, P.C.

(57) ABSTRACT

Disclosed is a throttle valve (1), having a housing (2), comprising an inlet opening (3) for a fluid under an inlet pressure, a throttle (4), by means of which the fluid can be throttled to an outlet pressure, and an outlet opening (5) for the fluid, and an actuation element (11) at the outside of the housing (2), a rotatable shaft (13), and a piston (16), which is axially movable within the housing (2) in a tubular throttle cage (15), wherein a rotation of the shaft (13) can be induced by the actuation element (11) and an axial movement of the piston (16) can be induced by the rotation of the shaft (13) and by the axial movement of the piston (16) a throttle cross section of the throttle (4) can be adjusted, For under water application, in particular in oil and gas drilling with large pipe cross sections the throttle valve according to the invention is improved, so that primary magnets are mounted to the actuation element (11, 32), secondary magnets are mounted to the shaft (13), and a roller body screw drive (20) is mounted to the shaft (13), wherein a rotation of the actuation element (11, 32) is transferred to the shaft (13) by means of magnetic coupling of the primary magnets with the secondary magnets, and converted into the axial movement of the piston (16) by means of the roller element screw drive (20).

10 Claims, 3 Drawing Sheets

U.S. PATENT DOCUMENTS

Figure 1:
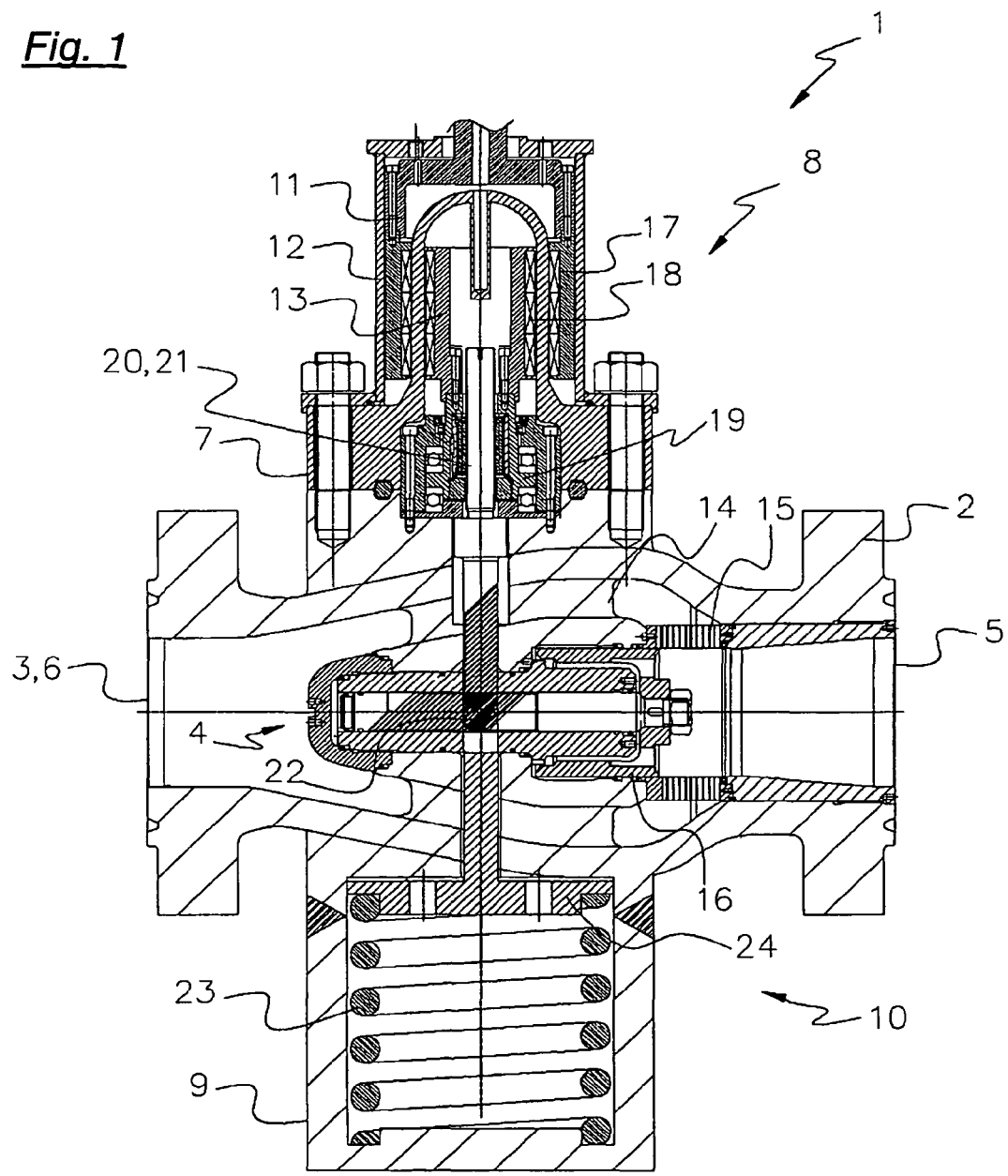

| | | | | |
|---|---|---|---|---|
| 4,274,444 A | * | 6/1981 | Ruyak | 251/65 |
| 4,327,757 A | | 5/1982 | Weevers | |
| 4,353,523 A | * | 10/1982 | Palti | 251/65 |
| 4,452,423 A | * | 6/1984 | Beblavi et al. | 251/65 |
| 4,565,210 A | * | 1/1986 | Heine et al. | 251/250 |
| RE33,782 E | * | 12/1991 | Fujita et al. | 251/129.11 |
| 5,529,282 A | * | 6/1996 | Lebkuchner | 251/250 |

FOREIGN PATENT DOCUMENTS

| | | |
|---|---|---|
| DE | 12 63 430 | 3/1968 |
| DE | 87 12 878 | 10/1988 |
| DE | 89 06 269 | 7/1989 |
| DE | 89 06 269 | 8/1989 |
| EP | 0 230 849 | 8/1987 |
| EP | 0 308 878 | 3/1989 |
| EP | 0 681 130 | 11/1995 |
| EP | 0 928 388 | 9/1999 |
| FR | 2 536 825 | 6/1984 |

OTHER PUBLICATIONS

Office Action issued by the GCC Patent Office in Application No. GCC/P/2008/10144 dated Sep. 21, 2011.

* cited by examiner

US 8,297,315 B2

THROTTLE VALVE

CROSS REFERENCE TO RELATED APPLICATIONS

This application is the National Stage of PCT/EP2008/000939 filed on Feb. 7, 2008, which claims priority under 35 U.S.C. §119 of German Application No. 10 2007 007 664.0 filed on Feb. 13, 2007. The international application under PCT article 21(2) was not published in English.

The invention relates to a throttle valve having a housing, comprising an inlet opening for a fluid under an inlet pressure, a throttle, by means of which the fluid can be throttled to an outlet pressure and an outlet opening for the fluid, and an actuation element on the exterior of the housing, a rotatable shaft and a piston, which is axially movable within the housing in a tubular throttle cage, wherein a rotation of the shaft is adjustable by means of the actuation element, and an axial movement of the piston can be induced by the rotation of the shaft, and a throttle cross section of the throttle is adjustable by the axial movement of the piston.

Throttle valves of the above mentioned type are generally known in a plurality of embodiments, e.g. from the program of the applicant. Such throttle valves with adjustable throttle cross sections are traditionally mostly provided as angle type valves, thus with a fluid flowing into the valve perpendicular to the axis of the piston and perpendicular to the outlet direction of the fluid, due to the easy accessibility for replacing wear parts in installed condition and due to the adjustment mechanism being comparatively simple from a mechanical point of view.

Recently, also throttle valves configured as axial type valves, thus with a piston movable coaxial to the inlet and outlet direction are being used. These additionally comprise smaller exterior dimensions with the flow parameters remaining the same and reduced stressing of the material by the flowing fluid, and thus reduced wear, due to the coaxial construction.

At the known throttle valves, the rotatable shaft is mechanically connected to the actuation element, e.g. by means of a flange. The rotation movement of the shaft is converted outside of the housing by means of helical threads, sliding in each other according to the nut and bolt principle, either directly into a linear movement of the piston in case of an angle type valve, or into a linear movement of an actuation spindle. In case of an axial construction, the actuation spindle and the piston are respectively provided with meshing conical gears, facilitating a redirection of the linear movement.

In the context of offshore drilling of oil and gas, increasingly first processing steps, e.g. compressing the drilled gas, are moved directly to the drilling location at the bottom of the ocean. This development necessitates an increased demand for components like throttle valves, suitable for underwater application.

These components have to be emission free, not only for environmental reasons, thus to assure a shielding of the flowing fluid (oil, gas) from the surrounding sea water, and to avoid an exit of the fluid into the ambient. Furthermore, a penetration of sea water, which is highly corrosive and loaded with microorganism, into the valve itself, or into the actuation elements, has to be avoided under all conditions. Eventually, any contact in particular of the electronics of the actuation elements with the conveyed fluid, which is also very aggressive due to contamination, in particular with hydrogen sulfide, is undesirable.

This shielding of elements of the throttle valve from the flowing fluid and also from the ambient, on the one hand, and, on the other hand, the absolute lack of emissions can only be accomplished with the concepts of the known throttle valves with substantially increased complexity for the seals, and with more stringent requirements with respect to material and surface qualities. On the other hand, there are partially substantial reservations on the user side against the use of non-metallic seal systems and means in underwater applications.

EP 0 308 878 A1 and EP 0 681 130 A1 disclose cut off valves with a rotatable ball head, FR 2 536 825 A1 with a linear motion piston driven by an adjustment thread, in which the rotatable shaft in the valve housing and the adjustment element outside of the valve housing are respectively connected by magnetic coupling. Thus, the flowing fluid is separated from the ambient without having to seal moving parts reaching through the housing.

OBJECT

It is the object of the invention to propose a throttle valve for underwater applications, in particular for oil and gas drilling with large cross sections.

SOLUTION

Based on known throttle valves, it is suggested according to the invention, that the throttle valve comprises primary magnets connected to the actuation element, secondary magnets connected to the shaft, and a roller element screw drive connected to the shaft, wherein a rotation of the actuation element is transferred to the shaft by means of coupling the primary magnets to the secondary magnets, and converted by the roller element screw drive into the axial movement of the piston.

By means of the magnetic coupling, like in the state of the art according to DE 87 12 878 U1, the adjustment element and the inner cavity of the housing are completely separated from one another, without requiring the sealing of moving components. The rotatable shaft, and in case of axial construction, also the actuation spindle are completely surrounded by the flowing fluid, and thus unloaded from pressure in axial direction.

The actuation moments, which can be transferred by the magnetic coupling from the actuation element to the rotatable shaft, are small and in particular do not reach the values required at the known components, which are typically large sized for underwater applications. Through the use of a roller element screw drive, the power loss, when converting the rotating movement of the shaft into a linear movement, and the actuation moment, required at the shaft are significantly reduced, while the design principle is otherwise substantially unchanged. Roller element screw drives are drive systems, particularly known from applications in metal working machine tools. For converting rotating and linear movements, balls or threaded rods (rollers) are used, which roll at least on the translatorically moved component. The rolling resistance of the rolling elements, which is substantially smaller, than the sliding friction between threads, allows a conversion with very small losses. The efficiencies of roller- and ball screw drives are substantially comparable. Roller screw drives, on the one hand, are much more compact than ball screw drives, and, on the other hand, facilitate a conversion of linear movement into rotation and vice versa.

A throttle valve according to the invention can comprise an actuation spindle on the one hand, wherein the rotation of the actuation element is initially converted by the roller screw drive into a linear movement of the actuation spindle, and a rack drive with conical gearing, by means of which the linear movement is converted into the axial movement of the piston. The inflow and outflow direction in such a throttle valve in axial construction are oriented the same way and coaxial to the piston.

Alternatively, the rotation of the actuation element can be converted in a throttle valve according to the invention by means of the roller screw directly into the axial movement of the piston. This way, the roller element screw drive is used according to the invention in particular in an angle type throttle valve.

In a preferred embodiment, a throttle valve according to the invention comprises a drive element with an electric motor for adjusting the throttle cross section. The throttle valve according to the invention is then suited in particular for use in automatically controlled systems. Alternatively, the actuation element of a throttle valve according to the invention can also be driven pneumatically, hydraulically, or also manually by a hand wheel, or by an actuation lever.

On such a throttle valve according to the invention, which is driven by an electric motor, the actuation element can be provided in particular as the stator, and the shaft can be provided as the rotor of the drive element, and the primary magnets can be provided as electromagnets, and the secondary magnets can be provided as permanent magnets. By integrating the actuation element and the shaft into the drive with the electric motor, the design of the throttle valve according to the invention is significantly simplified. The size and the manufacturing complexity and the cost of the throttle valve according to the invention are reduced.

In a particularly preferred embodiment, a throttle valve according to the invention comprises a spring element, which is loaded by the rotation of the actuation element, starting with a basic position, and by which the piston can be reversed into the initial position. Thus, a throttle valve according to the invention comprises a safety, in case the drive fails.

Generally known throttle valves with fail safety feature comprise linear movable adjustment devices. The fail safety in such valves can be simply realized by mounting a coil spring. The magnetic coupling requires an actuation means, which is rotatable in both directions, thus a reversal of the operating direction, which the roller element screw drive facilitates, in contrast to an adjustment thread comprising a helical adjustment thread and a nut. An axial force acting upon the actuation spindle is converted into a torque by the roller elements and transferred to the roller element screw drive housing and makes it rotate.

In such a throttle valve according to the invention in axial construction, the spring element can be disposed at the actuation spindle and can be loaded by its linear movement. In case of a drive failure, the spring element directly acts upon the actuation spindle initially, and indirectly acts upon the piston through the angle gearing, and indirectly acts upon the actuation element through the roller element screw drive. In this construction, in particular the spring element can be directly disposed within the housing. The force for loading the coil spring then has to be transferred by the actuation means through the magnetic clutch and the roller element screw drive to the actuation spindle. Accordingly, the magnetic coupling, and also the roller element screw drive have to be designed for transferring the respective forces and moments. Furthermore, the coil spring, which is contact with the actuation spindle, is in contact with the fluid, flowing through the throttle valve, since said coil spring is disposed in the interior of the housing. The material selection for the coil spring is thus restricted, like for all parts in the interior of the housing, so that they do not react with the fluid, and in particular that they are not corroded by the fluid.

Alternatively, in such a throttle valve according to the invention in axial, or in angle construction, the spring element can be mounted to the actuation element and can be loaded by the rotation of the actuation element. In case of a drive failure, the spring element then directly impacts the actuation element and it impacts the piston through the roller element screw drive, and possibly through the angle gearing. In this type of construction, typically the spring element with the actuation element is disposed outside of the housing. In this application a coil spring or a spiral spring can be used. As a further alternative, the spring element within the housing can be directly coupled to the piston rod.

At one of these throttle valves according to the invention with fail safety by means of a spring element, the throttle cross section can have its maximum opening in the basic position of the piston. Such a throttle valve according to the invention can be used e.g. as a pump prevention valve in the bypass between the inlet and outlet of a compressor. Alternatively, the throttle cross section in the basic position of the piston can be completely closed in some cases according to requirements, and can be set in any defined intermediary position.

The roller element screw drive of a throttle valve according to the invention preferably complies with NACE- and ISO standards for corrosion protection in the oil and gas industry. The roller element screw drive thus does not have to be shielded from the flowing fluid in a complex manner, which simplifies the design, and significantly reduces the requirements with respect to material and manufacturing tolerances. For example, the moving parts of a roller screw drive can be made of a ceramic material for this purpose.

A throttle valve according to the invention can control a contactless position indicator, e.g. by means of a permanent magnet and by means of an electromagnetic indicator at one of the moving components. Thus, the mechanical unreliability of the magnetic coupling is effectively avoided.

EMBODIMENT

Figure 2:
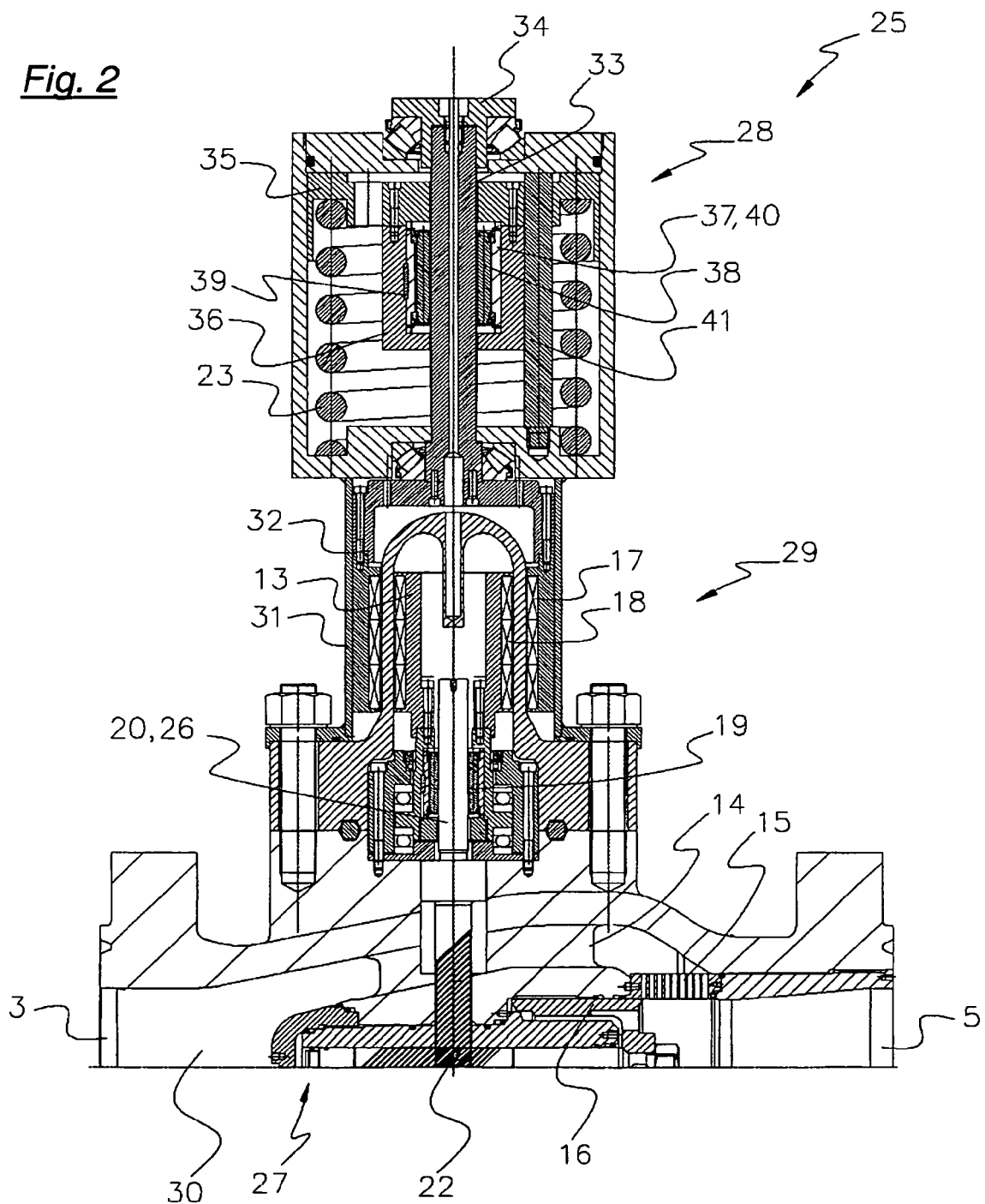

The invention is subsequently described with reference to two embodiments. It is shown in:

FIG. 1 a first throttle valve according to the invention;

FIG. 2 a second throttle valve according to the invention; and

Figure 3:
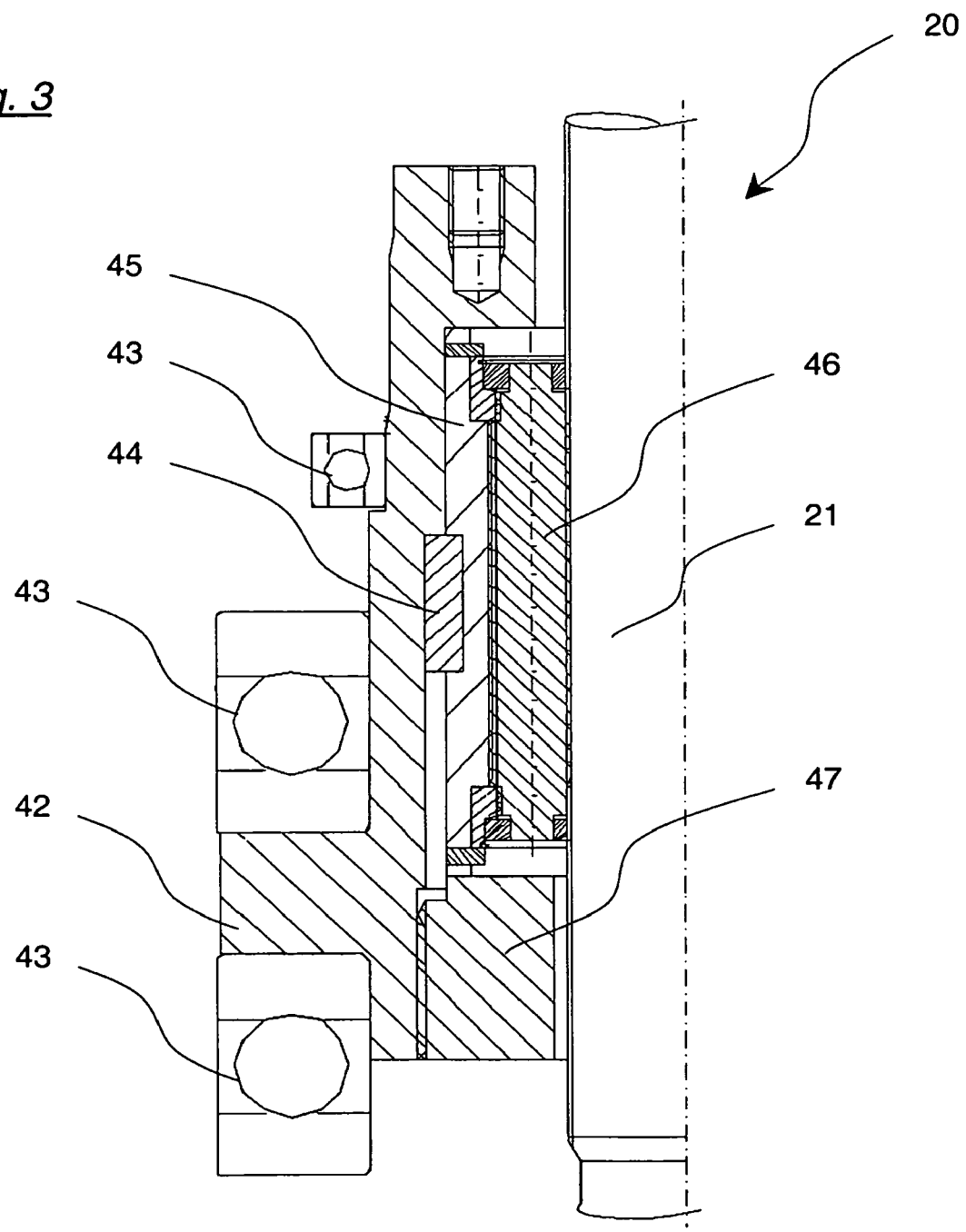

FIG. 3 a detail of the throttle valves according to the invention.

The first throttle valve according to the invention illustrated according to FIG. 1 comprises a housing 2, having an inlet opening 3 for a fluid under inlet pressure, which is not shown, a throttle 4, by means of which the fluid can be throttled to an outlet pressure, and an outlet opening 5 for the fluid. The housing 2 is comprised of a cast valve body 6, a housing 7, bolted to the valve body 6 on the outside, an actuation means 8, and a housing 9 of a safety means 10, also welded to the valve body 6 opposite to the actuation means 8.

The throttle valve 1 comprises a pot shaped rotatable actuation element 11, imposed on the actuation means 8, which is held by a pot shaped cage 12, which is in turn bolted to the actuation means 8. While the entire housing 2 of the throttle valve 1 is substantially flowed through by the fluid, this cage 12 is filled with a hydraulic fluid, which is environmentally compatible and in particular sea water compatible.

Within the actuation means 8, the throttle valve 1 comprises a tubular rotatable shaft 13. The throttle 4 is permanently installed in the valve body 6 by means of bars 14. It comprises a tubular throttle cage 15 with radial openings, and a piston 16, axially movable therein. By moving the piston 16, the non-illustrated openings of the throttle cage 15 are successively closed or opened, thus the effective throttle cross section of the throttle valve 1 is adjusted.

Several respective permanent magnets are mounted at the actuation element 11 as permanent magnets 17, and at the shaft 13 as secondary magnets 18. The shaft 13 is bolted to a support housing 19 of a roller element screw drive 20, which converts a rotation of the shaft 13 into a linear movement of an actuation spindle 21. The roller element screw drive 20 is substantially made of an oil- and gas resistant material.

The actuation spindle 21 extends within the housing 2 of the throttle valve 1 from the housing 7 of the actuation means 8 through the valve body 6 and the throttle 4 into the housing 9 of the safety means 10. The actuation spindle 21 in the throttle 4 has angle gearing and forms a gear rack 22, by engaging the piston 16, which also has angle gearing, wherein said gear rack converts the linear movement of the actuation spindle 21 into the axial movement of the piston 16, perpendicular to it.

The safety means 10 is substantially comprised of a spring element 23, here in the form of a coil spring, which holds its throttle cross section at maximum opening in the illustrated basic position of the throttle valve 1. By means of an axial movement of the piston 16 from the basic position, the throttle cross section is reduced and simultaneously a pressure plate 24 connected with the actuation spindle 21 is moved in the safety means 10, relative to the spring element 23. When the torque at the actuation element 11 is reduced below a value defined by the spring force, the safety means 10 automatically opens the throttle cross section up to the basic position.

The second throttle valve 25 according to the invention shown in FIG. 2 corresponds to the first throttle valve 1 with respect to the basic design and with respect to engineering details. Identical components and assemblies are thus designated in FIG. 2 according to FIG. 1. Subsequently, the differences to the first throttle valve 1 are described.

In the second throttle valve 25, the actuation spindle 26 extends into the throttle 27 and ends therein. The safety means 28 is not mounted to the valve body 30 opposite to the actuation means 29, but connected to the cage 31, which supports the actuation element 32, in a rigid manner. This actuation element 32 is bolted to a rotatable shaft 33, which reaches through the safety means 28, and which ends in a flange 34 for mounting a drive element, which is not shown.

The safety means 28 in turn is substantially comprised of a spring element 23 in the shape of a coil spring, which holds its throttle cross section in maximum open position. A pressure plate 35 in the safety means 28 is bolted to a support housing 36 of a roller screw drive 37. The rollers 38 are rotatably supported in the roller screw drive 37. The spring element 23 imparts an axial force onto a pressure plate 35. The rollers 38 of the roller screw drive 37 convert this axial force into a torque, imparted on the shaft 33. Within the support housing 36, a spline key 39 prevents a rotation relative to the screw drive housing 40. A guide rod 41 prevents a rotation of the pressure plate 35 around the shaft 33. The safety means 28 of the second throttle valve 25 is filled with the same environmentally compatible oil as the cage 31. A guide rod 41 prevents an undesired rotation movement of the pressure plate 35, of the support housing 36 and of the screw drive housing 40.

FIG. 2 shows the throttle valve 25, which is designed to open in an error condition, namely opening under a loss of the actuation moment, acting upon the actuation element 32 from the outside, wherein the throttle valve 25 is in completely open position. When closing the throttle valve 25, the rotation of the actuation element 32 is simultaneously converted through the roller 33, the roller screw drive 37, and the pressure plate 35 into an axial shortening of the spring element 23. In case of an error condition, the spring element 23 imparts an axial force onto the roller screw drive 37 through the pressure plate 35, and thereby causes a rotation of the shaft 33 and the actuation element 32, in order to reopen the throttle valve. The elements of the safety means 28, disposed here outside of the housing, are not in contact with the fluid flowing in the throttle valve, and can thus be configured simpler and manufactured more economically, compared to the throttle valve 1 according to FIG. 1.

FIG. 3 shows the roller elements screw drive 20 from the throttle valves 1 and 25 according to the FIGS. 1 and 2 in detail. The roller element screw drive 20 is disposed in a support housing 42, which is supported on roller bearings 43 in axial direction, and at the housing 2 in radial direction (not shown), and directly connected to the secondary magnet 18. A rotation of the support housing 42 is transferred here by means of a spline key 44 to the screw drive housing 45 of the roller elements screw drive 20. The roller elements 46 of the roller element screw drive 20 convert the rotation of the screw drive housing 45 into a linear movement of the actuation spindle 21. The roller element screw drive 20 is secured in the support housing 42 by means of a nut 47, which is threaded in.

The roller element screw drive 20 is configured as a roller screw drive due to its high efficiency. By means of a roller screw drive also the high closing velocities can be realized, which are required in order to prevent the transfer of pressure spikes.

DESIGNATIONS 1 throttle valve
2 housing
3 inlet opening
4 throttle
5 outlet opening
6 valve body
7 housing
8 actuation means
9 housing
10 safety means
11 actuation element
12 cage
13 shaft
14 bar
15 throttle cage
16 piston
17 primary magnet
18 secondary magnet
19 support housing
20 roller element screw drive
21 actuation spindle
22 gear rack drive
23 spring element
24 pressure plate
25 throttle valve
26 actuation spindle
27 throttle
28 safety means
29 actuation means
30 valve body
31 cage
32 actuation element
33 shaft
34 flange
35 pressure plate 36 support housing
37 roller screw drive
38 roller
39 spline key
40 screw drive housing
41 rod
42 support housing
43 roller bearing
44 spline key
45 screw drive housing
46 roller element
47 nut

What is claimed is:

1. A throttle valve (1, 25), having a housing (2), comprising an inlet opening (3) for a fluid under an inlet pressure, a throttle (4, 27), by means of which the fluid can be throttled to an outlet pressure, and an outlet opening (5) for the fluid, and an actuation element (11, 32) at the outside of the housing (2), a rotatable shaft (13), and a piston (16), which is axially movable within the housing (2) in a tubular throttle cage (15) having plural radial openings, wherein a rotation of the shaft (13) can be induced by the actuation element (11, 32) and an axial movement of the piston (16) can be induced by the rotation of the shaft (13) and by the axial movement of the piston (16) a throttle cross section of the throttle (4, 27) can be adjusted and the plural radial openings are successively closed or opened by the piston to determine an effective cross section for flow of the fluid, wherein primary magnets are mounted to the actuation element (11, 32), secondary magnets are mounted to the shaft (13), and a roller body screw drive (20) having balls or threaded rods is mounted to the shaft (13), said balls or threaded rods rolling at least on a translatorically moved component for converting between rotating and linear movement, wherein a rotation of the actuation element (11, 32) is transferred to the shaft (13) by means of magnetic coupling of the primary magnets with the secondary magnets, and converted into the axial movement of the piston (16) by means of the roller element screw drive (20).

2. A throttle valve (1, 25) according to claim 1, further comprising an actuation spindle (21, 26), wherein the rotation of the actuation element (11, 32) is initially converted into a linear movement of the actuation spindle (21, 26) by means of the roller element screw drive (20), and further comprising an angle geared rack drive (22), by means of which the linear movement is converted into the axial movement of the piston (16).

3. A throttle valve (1, 25) according to claim 2, further comprising a spring element (23), which is loaded by the rotation of the actuation element (11, 32), starting with a base position of the piston (16), and by which the piston (16) can be reversed into the base position, wherein the spring element (23) is mounted to the actuation spindle (21, 26) and loaded by its linear movement.

4. A throttle valve (1, 25) according to claim 3, wherein the spring element (23) is disposed within the housing (2).

5. A throttle valve (1, 25) according to claim 1, further comprising a drive element with an electric motor for adjusting the throttle cross section.

6. A throttle valve (1, 25) according to claim 1, further comprising a spring element (23), which is loaded by the rotation of the actuation element (11, 32), starting with a base position of the piston (16), and by which the piston (16) can be reversed into the base position.

7. A throttle valve (1, 25) according to claim 6, wherein the spring element (23) is mounted to the actuation element (11, 32) and loaded by the rotation of the actuation element (11, 32).

8. A throttle valve (1, 25) according to claim 6, wherein the throttle cross section is opened maximally in the base position of the piston (16).

9. A throttle valve (1, 25) according to claim 1, wherein the rotation of the actuation element (11, 32) is directly converted into the axial movement of the piston (16) by means of the roller element screw drive (20).

10. A throttle valve (1, 25) according to claim 5, wherein the actuation element (11, 32) is provided as a stator, and the shaft (13) is provided as a rotor of the drive element, and the primary magnets are provided as electromagnets, and the secondary magnets are provided as permanent magnets.

* * * * *